United States Patent
Roy et al.

(10) Patent No.: US 10,389,775 B2
(45) Date of Patent: Aug. 20, 2019

(54) MULTICAST AGGREGATION OF MULTIPLE STREAMING CONNECTIONS

(71) Applicant: Hughes Network Systems, LLC, Germantown, MD (US)

(72) Inventors: Satyajit Roy, Germantown, MD (US); Rohit Tripathi, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 31 days.

(21) Appl. No.: 15/161,168

(22) Filed: May 20, 2016

(65) Prior Publication Data
US 2017/0339200 A1 Nov. 23, 2017

(51) Int. Cl.
| G06F 15/16 | (2006.01) |
| H04L 29/06 | (2006.01) |
| H04B 7/185 | (2006.01) |
| H04L 12/46 | (2006.01) |
| H04L 12/66 | (2006.01) |
| H04N 21/266 | (2011.01) |
| H04N 21/61 | (2011.01) |

(52) U.S. Cl.
CPC ..... *H04L 65/4076* (2013.01); *H04B 7/18513* (2013.01); *H04B 7/18517* (2013.01); *H04L 12/4633* (2013.01); *H04L 12/66* (2013.01); *H04L 65/4084* (2013.01); *H04L 65/602* (2013.01); *H04L 65/605* (2013.01); *H04L 67/42* (2013.01); *H04N 21/26616* (2013.01); *H04N 21/6143* (2013.01)

(58) Field of Classification Search
CPC .................................................. H04L 65/4076
See application file for complete search history.

(56) References Cited

U.S. PATENT DOCUMENTS

| 6,515,994 | B1* | 2/2003 | Chuah | H04L 12/185 370/395.6 |
| 9,407,355 | B1* | 8/2016 | Lerner | H04B 7/18595 |
| 2012/0254370 | A1* | 10/2012 | Bacher | H04L 67/10 709/219 |
| 2013/0046848 | A1* | 2/2013 | Field | H04L 65/4076 709/217 |

(Continued)

FOREIGN PATENT DOCUMENTS

| EP | 2890081 A2 | 1/2015 |
| WO | 2010083248 A2 | 7/2010 |

OTHER PUBLICATIONS

IETF Internet Draft (Individual Submission) "HTTP Live Streaming" version 19, dated Apr. 4, 2016, (draft-pantos-http-live-streaming-19.txt).

(Continued)

*Primary Examiner* — Hieu T Hoang
(74) *Attorney, Agent, or Firm* — NovoTechIP International PLLC (57) ABSTRACT

A terminal receives a first request by a client for a slice of a data stream, and transmits the request to a streaming server. The terminal receives a first request by another client for the slice of the data stream and, in response, transmits the first request by the other client to the streaming server. The terminal receives a multicast packet that encapsulates the slice of the data stream, and extracts the slice. The terminal, then responds to the first request, by sending the client the extracted slice.

17 Claims, 6 Drawing Sheets

(56) References Cited

U.S. PATENT DOCUMENTS

2016/0205164 A1* 7/2016 Schmidt ............... H04L 1/0001
                                                    709/219
2016/0233950 A1* 8/2016 Chuberre ........... H04B 7/18578
2017/0085328 A1* 3/2017 Dickemann, Jr. ...... H04H 20/02

OTHER PUBLICATIONS

International Search Report and Written Opinion dated Aug. 21, 2017, by the International Searching Authority (European Patent Office) in PCT Application PCT/US2017/033867.

* cited by examiner

MULTICAST AGGREGATION OF MULTIPLE STREAMING CONNECTIONS

BACKGROUND

Live events, for example, sports games, can be transmitted over the Internet for real-time viewing by end users using, for example, the HLS (HyperTexTProtocol (HTTP) Live Streaming) protocol. Details of the HLS protocol are described in the IETF Internet Draft (Individual Submission) "HTTP Live Streaming" version 19, dated Apr. 4, 2016, (draft-pantos-http-live-streaming-19.txt) which is incorporated by reference herein in its entirety. HLS is an adaptive streaming protocol that works by breaking an overall stream into a sequence of small HTTP-based downloads, referred to as "media segments," and which may also be referred to as "slices." Each slice provides a small chunk of a potentially unbounded transport stream. Each end user device can include a client (e.g., a browser-based application program) that establishes a unique streaming session with a streaming web server. Each HLS client may select from a number of different "variant streams" (or "sub-streams") containing the same presentation encoded at a variety of data rates. This allows a client to request, both in initiating and maintaining a streaming session, material at an appropriate resolution for, or according to the capabilities of, a playback device on which it will be reproduced. Playback devices can include, for example, hand-held devices, laptop computers, and large-screen displays. As an example, a live streaming provider might operate a plurality of HLS live streaming servers providing the video portion of a presentation encoded at eight different resolutions, for example, 320×180, 512×288, 768×432 . . . 1280×720.

As described above, each client accessing a live streaming event establishes a unique streaming session with a streaming web server, and each streaming session is a separate unicast streaming session. Therefore, in live streaming events with a large population of viewers, the result can be a correspondingly large number of unicast streaming sessions traveling through the Internet, and through Internet Service Provider (ISP) interfaces. In addition, a large number of viewers access live streaming events through VSAT (very small aperture terminal) satellite distribution systems. The conventional HLS protocol establishment of a unique unicast streaming session with each client can place a very heavy load on conventional VSAT systems.

SUMMARY

This Summary identifies features and aspects of some example aspects, and is not an exclusive or exhaustive description of the disclosed subject matter. Whether features or aspects are included in, or omitted from this Summary is not intended as indicative of relative importance of such features. Additional features and aspects are described, and others will become apparent to persons skilled in the art upon reading the following detailed description and viewing the drawings that form a part thereof.

Disclosed methods include a method for multicasting audiovisual streams that can include receiving, at a first terminal, a request from a first terminal client for a slice of a live data stream and, in response, transmitting to a server the request from the first terminal client; receiving, at a second terminal, a request from a second terminal client for the slice of the live data stream and, in response, transmitting to the server the request from the second terminal client; and receiving at a gateway the slice of the live data stream from the server, with an indication the slice is in response to the request from the first terminal client and, in response, encapsulating the slice as a multicast packet, and delivering the multicast packet to the first terminal and the second terminal.

Particular implementations may include one or more of the following features.

For example, in one implementation, features can include the first terminal responding to the first terminal client request using the slice in the multicast packet delivered to the first terminal, and the second terminal responding to the second terminal client request using the slice in the multicast packet delivered to the second terminal. In an aspect, the first terminal can be a first Very Small Aperture Terminal, and the second terminal can be a second Very Small Aperture Terminal.

in one implementation, delivering the multicast packet to the first terminal and the second terminal can include transmitting the multicast packet from the gateway to a satellite, and multicasting the multicast packet from the satellite to the first terminal and the second terminal. In an implementation, the satellite can transmit a spot beam, the first terminal and the second terminal can be in the spot beam, and multicasting the multicast packet from the satellite to the first terminal and the second terminal can include a one-to-many transmission of the spot beam, concurrent toward the first terminal and the second terminal.

In one implementation, first terminal client can be a first terminal first client, and the method can include, in addition, receiving, at the first terminal, a request from a first terminal second client for the slice of a live data stream and, in response, transmitting to the server the first terminal second client request, and can include the first terminal responding to the request from the first terminal first client and to the request from the first terminal second client using the slice in the multicast packet delivered to the first terminal.

In an implementation, the slice of the live data stream received at the gateway can be a first instance of the slice, and the method can further include receiving, at the gateway, a second instance of the slice of the live data stream, with an indication the second instance was sent by the server in response to the request from the second terminal client and, in response, discarding the second instance.

Disclosed methods also include a method for receiving live streams, that can include receiving, at a terminal, a request from a terminal first client for a slice of a live data stream and, in response, transmitting to a server the request from the terminal first client, and receiving, at the terminal, a request from a terminal second client for the slice of the live data stream and, in response, transmitting to a server the request from the terminal second client. Exemplary features can also include receiving at a gateway the slice of the live data stream from the server, with an indication the slice is in response to the request from the terminal first client and, in response, encapsulating the slice as a multicast packet, and delivering the multicast packet to the terminal and the second terminal, and the terminal responding to the request from the terminal first client and to the request from the terminal second client using the slice in the multicast packet delivered to the terminal.

Disclosed apparatuses include terminal for interfacing streaming multimedia devices to streaming servers, and features can include a proxy server configured to receive a first request by a first client for a slice of a live data stream and, in response, transmit the first request by the first client to a server, and to receive a first request by a second client for the slice of the live data stream and, in response, transmit the first request by the second client to the server, multicast receiver logic configured to receive a multicast packet, the multicast packet encapsulating the slice of the live data stream, and to extract the slice of the live data stream from the multicast packet, a slices cache, configured to store the slice. In an aspect, the proxy server can be configured to respond to the first request by the first client by sending the extracted slice to the first client, and to respond to the first request by the second client by sending the extracted slice to the second client.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
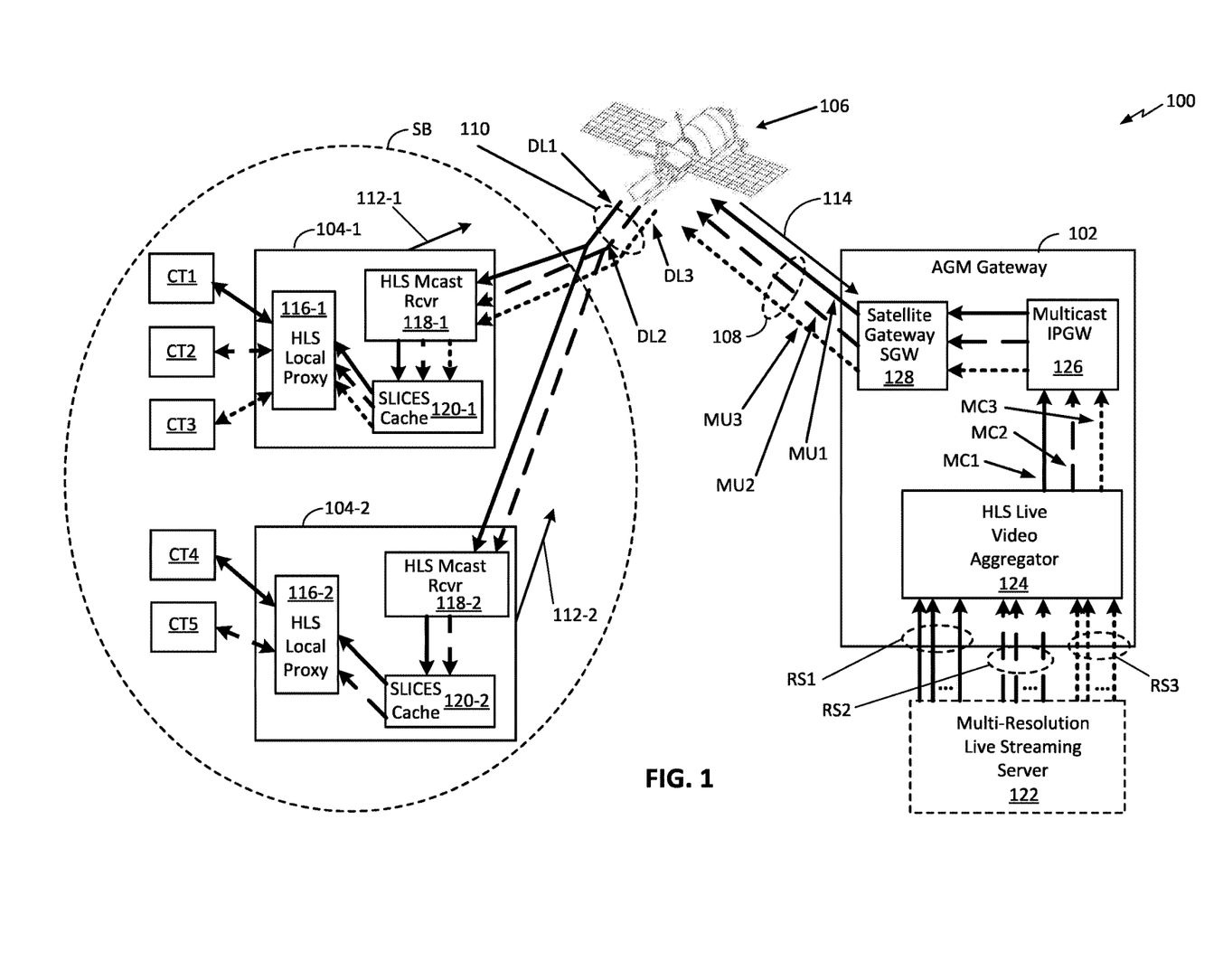
FIG. 1 illustrates one example of one system for aggregating and multicasting multiple connections to the same live stream.

FIG. 1 illustrates an example system 100 that includes a gateway 102, a first VSAT terminal 104-1 and a second VSAT terminal 104-2. For purposes of description, the first VSAT terminal 104-1 and the second VSAT terminal 104-2 will be referenced collectively as "VSAT terminals 104." Arranged between the gateway 102 and the VSAT terminals 104 can be a bent-pipe satellite link, formed of a satellite 106, forward uplink feeder links 108, forward downlink feeder links 110, reverse first uplink 112-1, reverse second uplink 112-2, and reverse downlink 114. The satellite 106 can be, for example, a space-borne High Throughput Satellite (HTS) configured to transmit data to a plurality of narrowly focused regional spot beams. A portion of one of the spot beams, labeled "SB," is visible in FIG. 1.

Referring to FIG. 1, individual directed lines leaving the satellite 106 within the forward downlink feed link 110 represent multicasting data streams transmitted by the satellite 106. For example, line segment DL1 represents a transmission from satellite 106 to spot beam SB of a multicast packet stream MU1, which the satellite 106 received over uplink forward feeder link 108. Generation of the multicast packet stream MU1 will be described later in greater detail. Line segment DL2 represents a transmission from satellite 106 to spot beam SB, of multicast packet stream MU2 that the satellite 106 received, over uplink forward feeder link 108. Line segment DL3 represents a transmission from satellite 106 to spot beam SB of multicast packet stream MU3 that the satellite 106 received, over uplink forward feeder link 108. Generation of multicast packet streams MU2 and MU3 will be described later in greater detail.

It will be understood two directed lines from the forward downlink 110 from satellite 106 to a respective two VSAT terminals (e.g., first VSAT terminal 104-1 and second VSAT terminal 104-2), are not representative of two individual transmissions from the satellite 106. When satellite 106 transmits downlink data, the same data is received (ignoring reception issues experienced by VSATs) by all of the VSATs in the spot beam SB. The directed line segment (not separately numbered) from the end of DL1 to the first VSAT terminal 104-1 represents the first VSAT terminal 104-1 operationally receiving, (e.g., decrypting) multicast packets the satellite 106 transmitted to the entire spot beam SB, as represented by DL1. Similarly, the directed line segment (not separately numbered) from the end of DL1 to second VSAT terminal 104-2 represents second VSAT terminal 104-2 operationally receiving (e.g., decrypting) DL1 multicast packets described above as received by the first VSAT terminal 104-1.

The directed line segment (not separately numbered) from the end of DL2 to VSAT terminal 104-1 represents the first VSAT terminal 104-1 operationally receiving, (e.g., decrypting) multicast packets the satellite 106 transmitted to the entire spot beam SB, as represented by DL2. Similarly, the directed line segment (not separately numbered) from the end of DL2 to second VSAT terminal 104-2 represents the second VSAT terminal 104-2 operationally receiving, (e.g., decrypting) DL2 multicast packets described above as received by the first VSAT terminal 104-1.

The directed line segment (not separately numbered) from the end of DL3 to VSAT terminal 104-1 represents the first VSAT terminal 104-1 operationally receiving, (e.g., decrypting) multicast packets the satellite 106 transmitted to the entire spot beam SB, as represented by DL3. Generation of the multicast packet stream MU3 will be described later in greater detail. The FIG. 1 example does not show a line segment from the end of DL3 to the second VSAT terminal 104-2. This represents the second VSAT terminal 104-2 not being configured to operationally receive the transmission represented by DL2. Regardless, the transmission represented by DL3 impinges on the antenna of the second VSAT terminal 104-2.

FIG. 1 shows one gateway 102 and one spot beam SB. One alternative implementation can include an additional gateway (not explicitly visible in FIG. 1), having functionality comparable to the gateway 102, and having a second set of forward uplink feeder links to the satellite 106. The satellite 106 can then multicast a different streaming content provided by the added gateway, to a different spot beam using methods and systems according to this disclosure. In another alternative implementation, which can be combined with the satellite 106, an elevated platform other than a satellite can be used. Examples include, and are not limited to, a balloon, airship, or unmanned aircraft vehicle (UAV), supporting transponder equipment such as provided in an HTS. In another implementation, a cell tower (not visible in FIG. 1) can perform operations described above as performed by the satellite 106.

Associated with forward downlink feeder links 110 can be downlink receiver dishes (not shown in FIG. 1) at the first VSAT terminal 104-1 and second VSAT terminal 104-2. Likewise, associated with the reverse first uplink 112-1 and reverse second uplink 112-2 can be reverse uplink transmitter dishes (not shown in FIG. 1) at the first VSAT terminal 104-1 and second terminal 104-2. In some example implementations of VSAT terminals 104, the same dish may be used as a receiver dish and a transmitter dish.

Referring to FIG. 1, the first VSAT terminal 104-1 can include a first HLS streaming proxy server 116-1, a first terminal multicast receiver 118-1, and a first terminal slices cache 120-1. Features of the first HLS streaming proxy server 116-1 can include interfacing a first client CT1, second client CT2, and third client CT3 to a live streaming server 122. The first client CT1, second client CT2, and third client CT3 will be collectively referenced as "first terminal clients." Each of the first terminal clients can be capable of requesting and maintaining—through the first HLS streaming proxy server 116-1—a unique live streaming session with live streaming server 122. Example first terminal clients can include, but are not limited to, HTTP client applications running on "smart phones," laptop computers, digital tablet devices, and desktop computers, and can include IP television (IPTV). The live streaming server 122 can be configured to provide one resolution of a live streaming event, and can be configured to provide multiple resolutions of a live streaming event. For example, the live streaming server 122 illustrated in FIG. 1, can provide, as arbitrary examples, resolution RS1, resolution RS2, and resolution RS3. FIG. 1 shows the live streaming server 122 providing multiple streams for each of the example resolutions. As will be understood from this disclosure, from the perspective of the live streaming server 122, each of the multiple streams is seen as a unique unicast stream to a specific client, for example, one of the first terminal clients described above, or one of an additional set of example clients described later in further detail.

Continuing to refer to FIG. 1, first terminal multicast receiver 118-1 can be configured to receive multicast packets (not explicitly visible in FIG. 1) of slice data multicast by the satellite as DL1, then extract slice(s) or slice data from the received multicast packets. The first terminal multicast receiver 118-1, or the first terminal slices cache 120-1, or both in combination can be configured to load the slice(s) or slice data extracted from the multicast packets into the first terminal slices cache 120-1. The first HLS streaming proxy server 116-1 can also be configured to maintain a fill state of the first terminal slices cache 120-1, as a buffering to accommodate varying delays in receiving slices from the streaming server 122.

The second VSAT terminal 104-2 can include, in a configuration similar to the first VSAT terminal 104-1 described above, second HLS streaming proxy server 116-2, second terminal multicast receiver 118-2, and second terminal slices cache 120-2. The second terminal multicast receiver 118-2 can be implemented, for example, as an HLS multicast receiver. Functions of the second HLS streaming proxy server 116-2 can include interfacing a fourth client CT4 and a fifth client CT5 to the live streaming server 122. The fourth client CT2 and fifth client CT5 will collectively referenced as "second terminal clients." As described for the first terminal clients, each of the second terminal clients can be capable of requesting and maintaining—through the second HLS streaming proxy server 116-2—a unique live streaming session with live streaming server 122.

Gateway 102 can be configured to provide content items, for example, slices for any of the resolution RS1, resolution RS2, and resolution RS3 live streams provided by the multiple resolution live streaming server 122, to remote sites included in its associated cells, for example, the VSAT terminals 104 in spot beam SB, in response to content requests received from clients at the remote sites, such as any of the first terminal clients or the second terminal clients described above. For example, according to the HLS protocol, HTTP-based content requests are issued for individual slices. The content requests may be received via radio communications, such as via the first and second reverse radio uplinks 112-1 and 112-2 and reverse downlink 114. Alternatively, the content requests may be received via terrestrial communications, such as via a telephone modem or DSL (digital subscriber line) network connection.

In an aspect, the gateway 102 can be configured to detect multiple requests from a corresponding multiple clients for the same resolution live stream being provided by the multiple resolution live streaming server 122. In a further aspect, gateway 102 can be configured to provide, upon detecting multiple requests from multiple clients for the same slice of the resolution live stream, an aggregation of the responses from the multiple resolution live streaming server 122 that sends only one of the responses, as a single stream for multicasting as a one-to-many transmission to all of the multiple requesting clients. Accordingly, the gateway 102 can be referred to as an "aggregating and multicasting gateway" 102 or "AGM 102." The AGM gateway 102 can include an HLS video aggregator 124, a multicast IP gateway (IPGW) 126 and a satellite gateway (SGW) 128. In an aspect, the HLS video aggregator 124 can be configured to detect multiple requests from multiple clients for the same slice of one resolution live stream, forward all to multiple resolution live streaming server 122 and, upon receiving slice data responding to the first of such requests, to encapsulate in a multicast packet. The HLS video aggregator 124 can be configured to send the multicast packet to the multicast IPGW 126. The multicast IPGW 126 can send the multicast packet(s) to the satellite 106, through the satellite gateway 128.

Referring to FIG. 1, in one example operation of the AGM 102, the HLS video aggregator 124 can detect multiple requests from multiple clients (e.g., one or more of the first terminal clients and one, or more of the second terminal clients) for the same slice of the resolution data stream, e.g., the resolution RS1 data stream. The HLS video aggregator 124, upon receiving the response from the multiple resolution live streaming server 122 to the request from the first client, can encapsulate that response into a multicast packet or packet stream MC1. HLS video aggregator 124 can send the multicast packet or packet stream MC1 to the multicast IPGW 126. The multicast IPGW 126 can send the multicast packet or packet stream MC1 to the satellite gateway SGW 128 for sending as multicast uplink packet MU1 to the satellite 106. The satellite 106 can then transmit as DL1 to the entire spot beam SB the multicast uplink packet MU1. In the FIG. 1 example, the first VSAT terminal 104-1 and the second VSAT terminal 104-2 can each be configured to receive DL1, as represented by the solid lines extending from the end of DL1 to the first VSAT terminal 104-1 and to the second VSAT terminal 104-2.

In another operation of the AGM 102, the HLS video aggregator 124 can detect multiple requests from multiple clients for the same slice of the resolution RS2 data stream. The HLS video aggregator 124, upon receiving the multiple resolution live streaming server 122 response to the request from the second client, can encapsulate that response into a multicast packet or packet stream MC2. HLS video aggregator 124 can send the multicast packet or packet stream MC2 to the multicast IPGW 126. The multicast IPGW 126 can send the multicast packet or packet stream MC2 to the satellite gateway SGW 128 for sending as multicast uplink packet MU2 to the satellite 106. The satellite 106 can then transmit as DL2 to the entire spot beam SB the multicast uplink packet MU2. Also, in the FIG. 1 example, the first VSAT terminal 104-1 and the second VSAT terminal 104-2 can each be configured to receive DL2, as represented by long dashed line extending from the end of DL2 to the first VSAT terminal 104-1 and the second VSAT terminal 104-2.

The HLS video aggregator 124, in an aspect, can detect multiple requests from multiple clients for the same slice of the resolution RS3 data stream. The HLS video aggregator 124, upon receiving the multiple resolution live streaming server 122 response to the first of these requests, can encapsulate that response into a multicast packet or packet stream MC3. HLS video aggregator 124 can send the multicast packet or packet stream MC3 to the multicast IPGW 126. The multicast IPGW 126 can send the multicast packet or packet stream MC3 to the satellite gateway SGW 128 for sending as multicast uplink packet MU3 to the satellite 106. The satellite 106 can then transmit as DL3 to the entire spot beam SB the multicast uplink packet MU1. In the FIG. 1 example, only the first VSAT terminal 104-1 is configured to receive DL3.

In an aspect, the AGM 102 can be configured, as will be described in greater detail in reference to FIGS. 2A, 2B, 3A and 3B, to detect multiple requests for the same slice of the same resolution stream and, addition to aggregation and encapsulation for multicasting, to appear to the multiple resolution live streaming server 122 as providing multiple unique unicast streams, one to each requesting client.

Figure 2A:
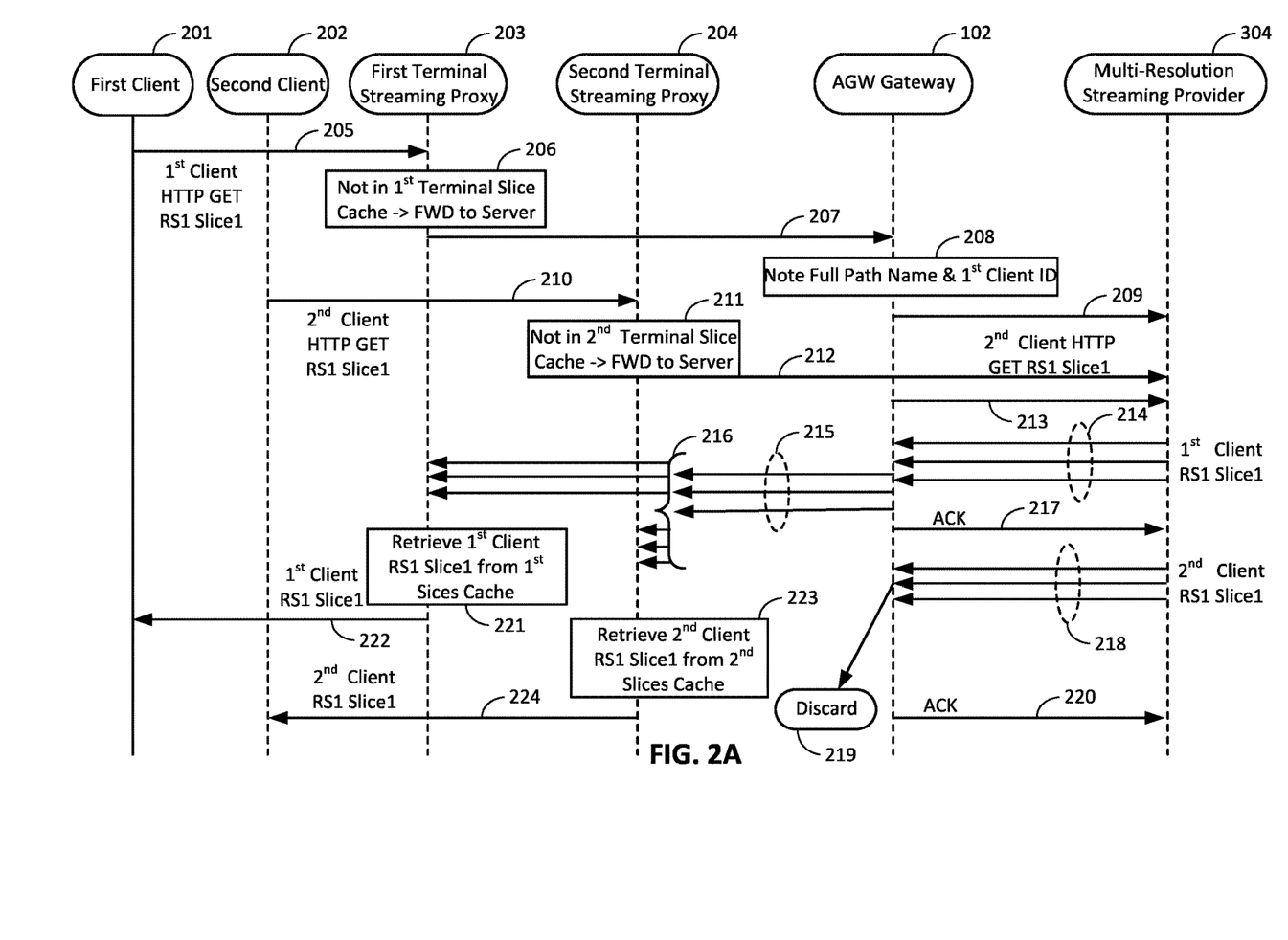
FIGS. 2A and 2B illustrate, respectively, a first portion and second portion of a ladder diagram representing sequences and contexts of events in a process for aggregating and multicasting multiple connections to the same live streams.
Figure 2B:
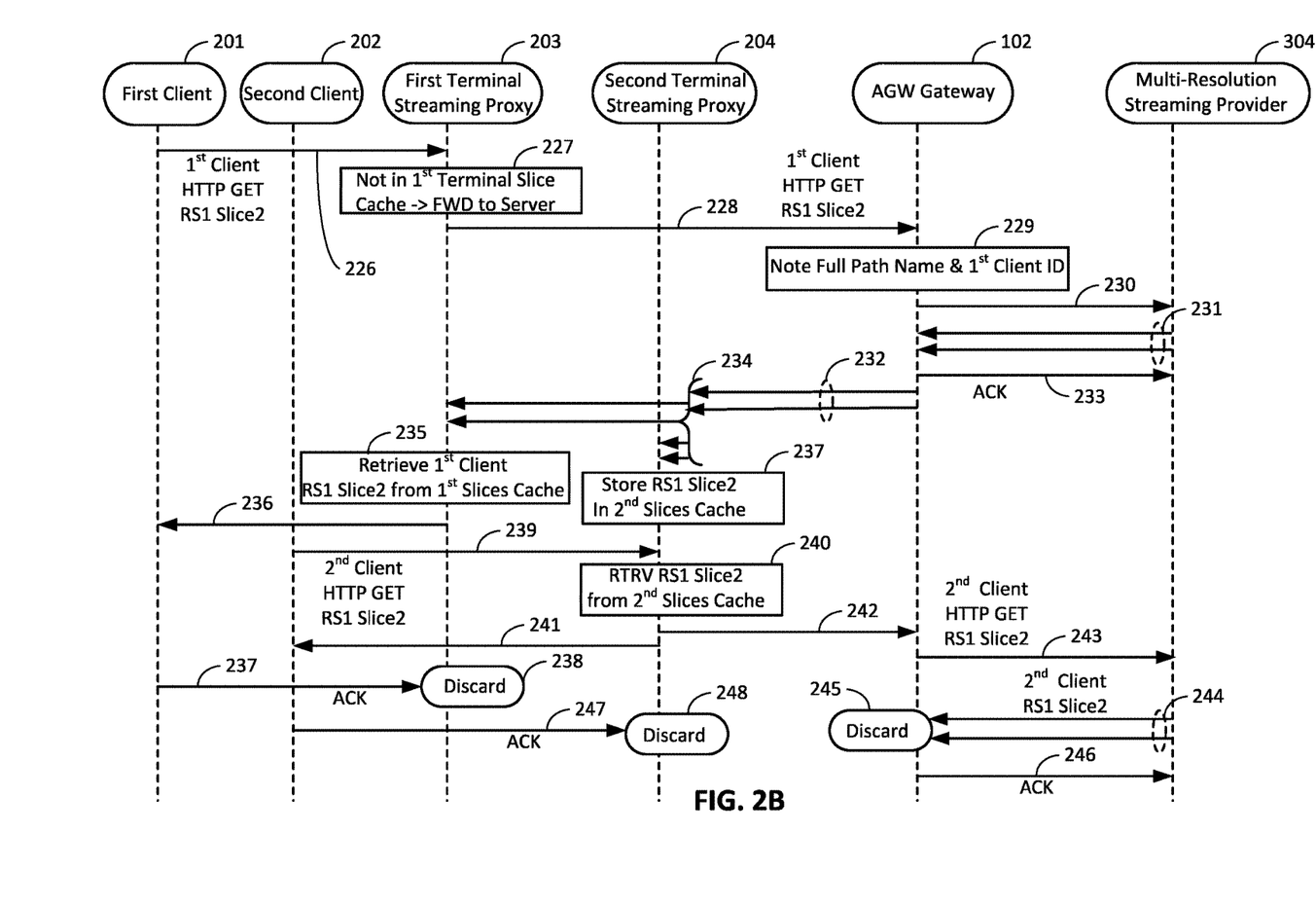

FIGS. 2A and 2B illustrate, respectively, a first portion and second portion of a ladder diagram representing sequences and contexts of events in a process for aggregating and multicasting multiple connections to the same live stream. The process will be referred to as "process 200." For convenience, certain examples of the events and contexts are described in reference to the system 100. Description will assume a first client 201 and a second client 202, each running application programs that are accessing the same resolution live stream, for example, resolution RS1.

Description of example operations and events in the process 200 will assume a first scenario, which is the first client 201 and second client 202 being respective clients of different terminals. Referring to FIG. 1, an example according to this scenario can be the first client CT1 being the first client 201, and the fourth client CT4 being the second client 202. Example operations in a second scenario, in which the first client 201 and second client 202 are two separate clients of the same terminal, e.g., second client CT2 and third client CT3, will be described in greater detail in reference to FIGS. 3A and 3B.

Referring to FIG. 2A, a starting event in an example of process 200 can be the first client 201 sending, at 205, an HTTP GET request for a particular slice of live stream RS1, the slice labeled here for reference as "RS1 Slice1." The HTTP GET request will be referenced as the "first client HTTP GET RS1 Slice1 request." Detailed description of example operations in the process 200 after the sending at 205 is under two assumptions: i) the second client 202 has not, as of event 205, sent its HTTP GET request for RS1 Slice1; and ii) the second client 202 was not the first requestor of the slice of RS1 that preceded RS1 Slice1.

The streaming provider first terminal proxy 203 receives the first client HTTP GET RS1 Slice 1 request sent at 205 and responds, at 206, by determining that the first terminal local slices cache (e.g., the FIG. 1 first terminal slices cache 120-1) does not have RS1 Slice 1. In response, at 207, the streaming provider first terminal proxy 203 forwards the first client HTTP GET RS1 Slice1 to an aggregating and multicasting gateway, for example, the AGM gateway 102. The AGM gateway 102, at 208, detects the first client HTTP GET RS1 Slice1 request as the first, from any client, for that slice of RS1. Operations at 208, in response, can store the full path name of the RS1 Slice1, together with the client ID of the first client 201 and, at 209, can forward that first client HTTP GET RS1 Slice1 request to the streaming provider server. For this example, the streaming provider server can be the multiple resolution live streaming server 122.

At 210, the second client can send to the streaming provider second terminal proxy 204 a second client HTTP GET RS1 Slice1 request. The streaming provider second terminal proxy 204 responds, at 211, by determining that the second terminal local slices cache (e.g., the second terminal slices cache 120-2) does not have RS1 Slice 1 and, in response, at 212, can forward the second client HTTP GET RS1 Slice1 request to the AGM gateway 102. The AGM gateway 102, having detected at 208 the first client HTTP GET RS1 Slice 1 request as the first request for that RS1 Slice1, omits repeating the operations at 208, and forwards at 213 the second client HTTP GET RS1 Slice1 request to multiple resolution live streaming server 122.

Continuing with the example, at 214, the AGM gateway 102 receives a "first client RS1 Slice1," provided by the multi-resolution streaming server 122 in response to the first client HTTP GET RS1 Slice1 request forwarded at 209. At 215, upon receiving first client RS1 Slice1, the AGM gateway 102, based on the first client HTTP GET RS1 Slice1 request being the first request for RS1 Slice 1, encapsulates and transmits the first client RS1 Slice1 within a multicast packet. Referring to FIG. 1, the multicast packet can be in the multicast packet stream MC1 generated by the AGM 102. The multicast packet is labeled for description as "RS1 Slice1 multicast packet," and the transmittal at 215 is for a multicast at 216, a one-to-many broadcast, that will be received by the first client 201 and the second client 202. Referring to FIG. 1, operations at 215 of forming the RS1 Slice1 multicast packet can be performed by the multicast IPGW 126 of the AGM gateway 102. The SGW 128 can transmit the RS1 Slice1 multicast packet in one of the forward feed uplinks 108 to the satellite 106. Operations at 216 can include the satellite 106 transmitting the RS1 Slice1 multicast packet in the spot beam SB, for reception by the first terminal HLS multicast receiver 118-1 and the second terminal HLS multicast receiver 118-2. Operations at 216 can also include a first terminal resource, for example, the HLS multicast receiver 118-1, extracting the RS1 Slice 1 packet from the RS1 Slice1 multicast packet, and loading the extracted RS1 Slice 1 into the first terminal local slices cache, for example, the first terminal local slices cache 120-1. Operations at 216 can also include a second terminal resource, for example, the HLS multicast receiver 118-2, extracting the RS1 Slice 1 packet from the RS1 Slice1 multicast packet it received, and loading the extracted RS1 Slice 1 into the second terminal local slice cache, for example, the second terminal slices cache 120-2.

Continuing with example operations in the process 200, upon successful receipt of the first client RS1 Slice1 at 214, the AGM gateway 102 can send, at 217, an acknowledgement to the multi-resolution streaming server 122.

Either during, overlapping with, or after the AGM gateway 102 receiving, at 214, the first client RS1 Slice1, the AGM gateway 102 can receive, at 218, a second client RS1 Slice1 from the multiple resolution live streaming server 122. The second client RS1 Slice1, in this example, is in response to the second client HTTP request for RS1 Slice1 that the AGM gateway 102 sent at 212. The AGM gateway 102, though, has already sent the RS1 Slice 1 to the second client 204, by the sending at 215 of the RS1 Slice1 multicast packet. The AGM gateway 102 therefore, at 219, discards the second client RS1 Slice 1. The multiple resolution live streaming server 122, however, is not aware of the discard at 219 because, at 220, the AGM gateway 102 sends acknowledgment that the second client RS1 Slice1 was received. It will be appreciated that the multicast delivery at 216, in combination with the discard at 219, provides both the first client 202 and the second client 204 with RS1 Slice1 with no substantial bandwidth increase over providing the slice to only the first client 202.

Referring to FIG. 2A, in response to the RS1 Slice1 being loaded, at 216, into the first terminal local slices cache (e.g., the FIG. 1 first terminal slices cache 120-1), the streaming provider first terminal proxy 203 can, at 221, retrieve RS1 Slice1 RS1 Slice1 from the first terminal local slices cache and, at 222, send RS1 Slice1 to the first client, e.g., the IPTV example of CT1. Since the operations at 216 included loading the second terminal local slices cache (e.g., the FIG. 1 second terminal slices cache 120-2), the streaming provider second terminal proxy 203 can, at 223, retrieve RS1 Slice 1 RS1 Slice 1 from the second terminal local slices cache and, at 224, send RS1 Slice1 to the second client, e.g., the browser example of CT4.

In the above-described operations in process 200, the AGM gateway 102 had not received a request for a slice of RS1 from the second client 202 prior to receiving the second client request 210. Absent having already received the second client request 210 when the AGM gateway 102 received the first client RS1 Slice 1 at 215, the encapsulation and transmission at 216 of the RS1 Slice1 multicast packet may be omitted. AGM gateway 102 would have no knowledge of the second client 202 wanting the stream RS1. However, in one implementation, upon the AGM gateway 102 receiving a request from the first client 210 for the next slice in RS1, for example RS1 Slice2, without receiving any discarded connection notice (or equivalent) regarding the second client 202, the AGM gateway 102 can assume that the second client 202 will request that next RS1 slice. Accordingly, in an aspect, the AGM gateway 102 can encapsulate and transmit toward both the first client 201 and the second client 202 the next slice of RS1 requested by the first client 201—before the AGM gateway 102 receives the second client request for that second slice of RS1. Assuming the second slice of RS1 is RS1 Slice2, the second terminal, for example the second VSAT 104-2, can receive the multicast RS1 Slice2 packet and store the RS1 Slice2 content in its local slices cache—before receiving the second client HTTP GET RS1 Slice2 request. Then, when the streaming provider second terminal streaming proxy 204 does receive the second client HTTP GET RS1 Slice2 request, the RS1 Slice2 will be in the second terminal slices cache. The streaming provider second terminal proxy 204 can, in response, send to the second client 202 the RS1 Slice2 from the second terminal slices cache, in addition to forwarding the second client HTTP GET RS1 Slice2 request to the AGW gateway 102. The AGW gateway 102, in turn, can forward the second client HTTP GET RS1 Slice2 request to the multiple resolution live streaming server 122. Examples of these and additional operations will be described in reference to FIG. 2B.

Referring to FIG. 2B, at 226 the first client 201 sends HTTP GET RS1 Slice2 to the streaming provider first terminal proxy 203. The streaming provider first terminal proxy 203 determines, at 227, that RS1 Slice2 is not in the first terminal local slices cache and, at 228, forwards the first client HTTP GET RS1 Slice2 request to the AGW gateway 102. The AGW gateway 102, at 229, records the full path name of the RS1 Slice2, and the client ID of the first client 201 and, 230, forwards the first client HTTP GET RS1 Slice2 request to the multiple resolution live streaming server 122.

At 231, the AGW gateway 102 receives from the multiple resolution live streaming server 122 the "first client" RS1 Slice2, in response to the first client HTTP GET RS1 Slice2 request. The AGM gateway 102, in response, encapsulates and transmits at 232 the first client RS2 Slice2 within a multicast packet. The multicast packet is labeled for description as "RS1 Slice2 multicast packet." In an aspect, the transmittal at 232 is for a multicast at 234, a one-to-many broadcast that will be received by the first client 201 and the second client 202. Referring to FIG. 1, operations at 232 of forming the RS1 Slice2 multicast packet can be performed by the multicast IPGW 126. The SGW 128 can transmit the RS1 Slice2 multicast packet in one of the forward feed uplinks 108 to the satellite 106. Operations at 234 can include the satellite 106 transmitting the RS1 Slice2 multicast packet in the spot beam SB, for reception by the first terminal HLS multicast receiver 118-1 and the second terminal HLS multicast receiver 118-2. Operations at 234 can also include a first terminal resource, for example, the HLS multicast receiver 118-1, extracting the RS1 Slice 2 packet from the RS1 Slice2 multicast packet, and loading the extracted RS1 Slice 2 into the first terminal local slices cache, for example, the first terminal local slices cache 120-1. Operations at 234 can also include a second terminal resource, for example, the HLS multicast receiver 118-2, extracting the RS1 Slice2 packet from the RS1 Slice2 multicast packet that it received, and loading the extracted RS1 Slice1 into the second terminal local slice cache, for example, the second terminal slices cache 120-2.

Referring to FIG. 2B, a feature of the process 200 is that the multicasting operations at 232 and 233 have loaded the RS1 Slice2 into the second terminal local slices cache, associated with the second client 204, prior to the second client HTTP GET request RS1 Slice2 being received at the streaming provider first terminal proxy 203.

At 235, the streaming provider first terminal proxy 203 can respond to the first client HTTP GET RS1 Slice2 226, by retrieving RS1 Slice2 from the first terminal local slices cache and, at 236, deliver it to the first client 201. In an example operation, the client 201 can respond, at 237, with an acknowledgment that can be received by the streaming provider first terminal proxy 203. The streaming provider first terminal proxy 203, at 238, can discard the acknowledgment. The discarding at 238 can be performed because, at 233, the AGW gateway 102 already acknowledged successful receipt of the RS1 Slice2. In one example, either before or after the operations at 235 and 236, the second client 202 can send, at 239, the second client HTTP GET RS1 Slice2 request. At 240 the streaming provider second terminal proxy 204, in response to the second client HTTP GET RS1 Slice2, finds the RS1 Slice2 in the second terminal local slices buffer and performs two operations in response. One is a sending, at 241, of RS1 Slice2 to the second client 202. The other is forwarding, at 242, of the second client HTTP GET RS1 Slice2 request to the AGW gateway 102 for forwarding, at 243, to the multiple resolution live streaming server 122. The multiple resolution live streaming server 122, at 244, responds to the second client HTTP GET RS1 Slice2 request with the RS1 Slice2. The second client 202, however, does not need RS1 Slice2, as it was already delivered through operations at 232 and 234. The AGW gateway 102 therefore, at 245, discards the RS1 Slice2 received at 244 but sends, at 246, acknowledgement of successful receipt to the multiple resolution live streaming server 122. The multiple resolution live streaming server 122, by receiving the second client HTTP GET RS1 Slice2 request at 243 and the acknowledgement of successful receipt at 246, can keep a streaming connection open or active for the second client 202.

Referring to FIG. 2B, and continuing with description of example operations, at 247 the second client 202 can send an acknowledgment to the streaming provider second terminal proxy 204, for forwarding to the multiple resolution live streaming server 122, of successful receipt of the RS1 Slice2 sent at 241. The streaming provider second terminal proxy 203, at 248, can discard the acknowledgment. The discarding at 248 is performed because, at 246, the AGW gateway 102 acknowledged (or will acknowledge) successful receipt of the second client RS1 Slice2 (sent by the multiple resolution live streaming server 122 in response to second client HTTP GET RS1 Slice2 request.

Figure 3A:
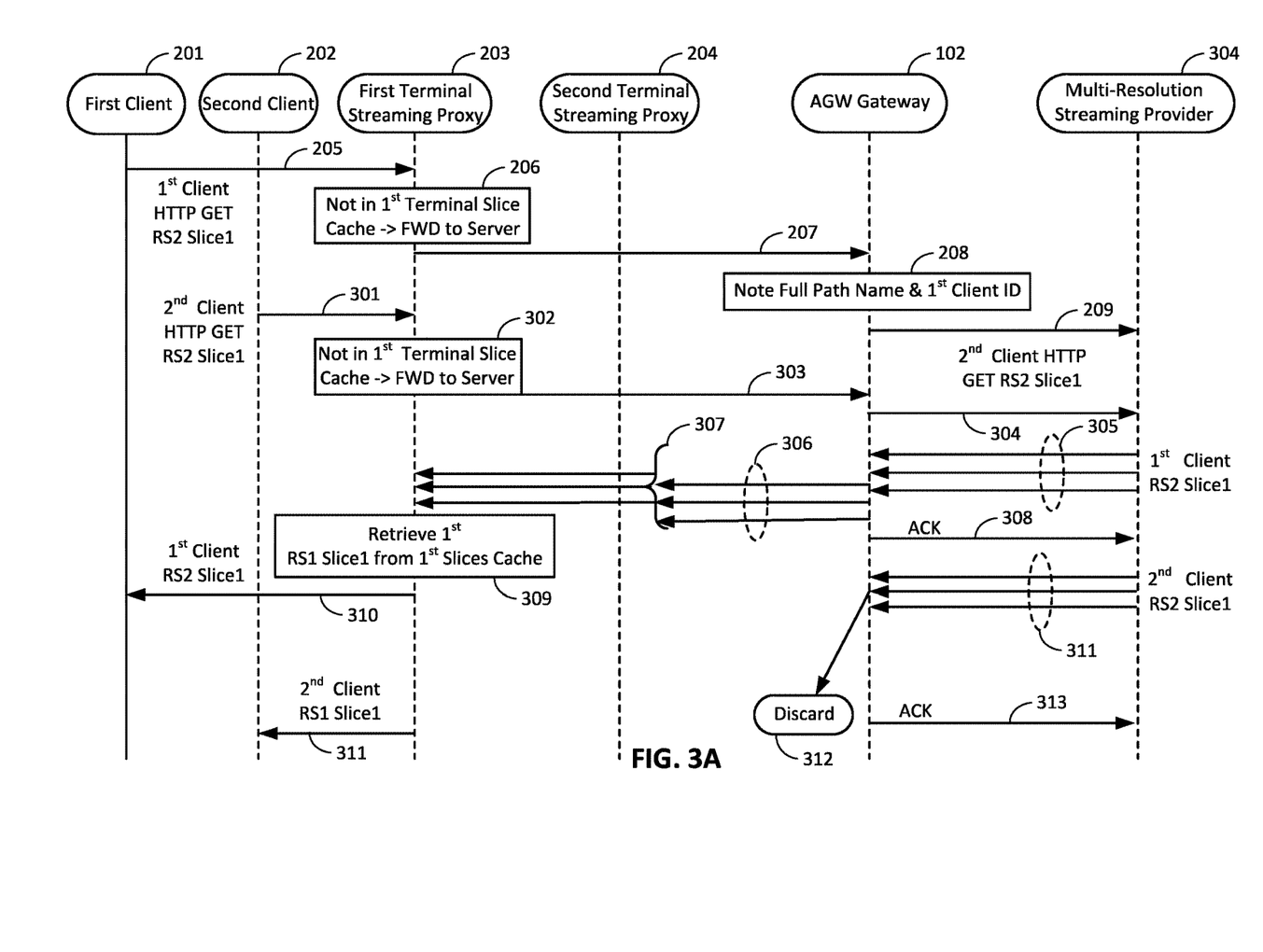
FIGS. 3A and 3B illustrate, respectively, a first portion and second portion of another ladder diagram representing sequences and contexts of events in another process for aggregating and multicasting multiple connections to the same live streams.
Figure 3B:
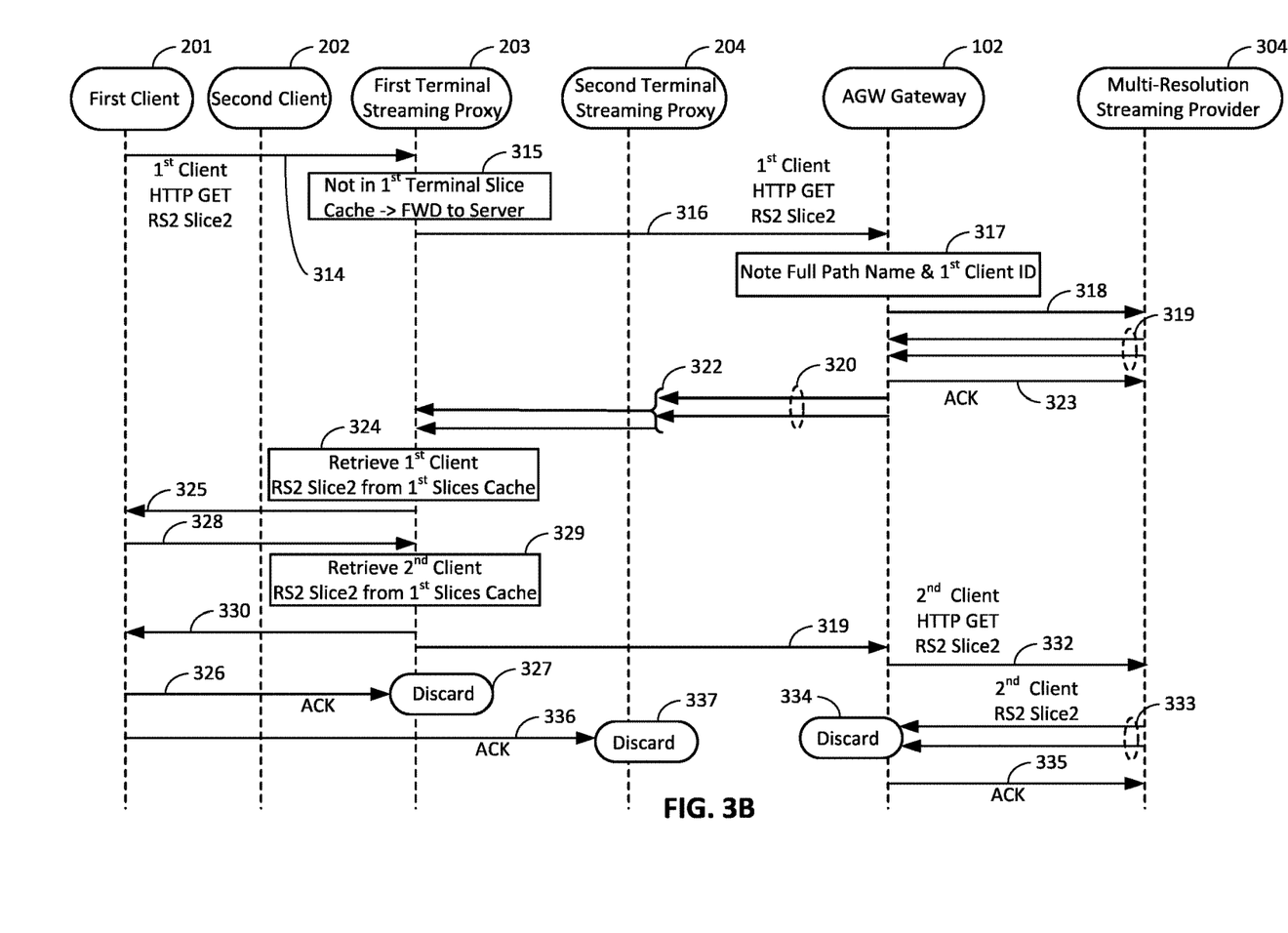

Description above in reference to FIGS. 2A and 2B assumed a first scenario, which is the first client 201 and second client 202 being respective clients of different terminals. Referring to FIGS. 3A and 3B, example operations in the second scenario, in which the first client 201 and second client 202 are two respective clients of the same terminal, will be described in reference to a process 300. Like operations are labeled identical to FIGS. 2A and 2. Example operations will be described assuming the first client 201 and the second client 202 are requesting the same slices of a second resolution, for example, resolution RS2. Client 201 can be the above-described IPTV example of client CT1. Client 2 can be another multimedia device running, for example a smart phone providing client CT2, which is also linked as a client of the second HLS streaming proxy server 116-2.

In one example, operations at 201 through 209 can be as described in reference to the first scenario, except for the request at 205 being a first client HTTP GET RS2 Slice1 request. At 301, the second client sends, to the streaming provider first terminal proxy 203, a second client HTTP GET RS2 Slice1 request. The streaming provider first terminal proxy 203 responds, at 302, by determining the first terminal local slices cache does not have RS2 Slice1, and therefore forwarding at 303 the second client HTTP GET RS2 Slice1 request to the AGM gateway 102. The AGM gateway 102, having detected at 208 the first client HTTP GET RS2 Slice1 request as the first request for that RS2 Slice1, omits repeating the operations at 208, and forwards at 304 the second client HTTP GET RS2 Slice1 request to the multiple resolution live streaming server 122. At 305 the AGM gateway 102 receives from the multi-resolution streaming server 122 a first client RS2 Slice1 in response to the first client HTTP GET RS2 Slice1 request forwarded at 209. The AGM gateway 102, in response at 306, based on the first client HTTP GET RS2 Slice1 request being the first request for RS2 Slice1, encapsulates and transmits the first client RS2 Slice1 within a "RS2 Slice1 multicast" which, at 307 is multicast for reception by the respective terminals for the client 201 and the second client 202. Upon successful receipt of the first client RS2 Slice1 at 305, the AGM gateway 102 can send, at 308, an acknowledgement to the multi-resolution streaming server 122. The RS2 Slice1 multicast packet can be formed by the multicast IPGW 126. The SGW 128 can transmit the RS2 Slice1 multicast packet in one of the forward feed uplinks 108 to the satellite 106. Operations at 307 can include, for example, the satellite 106 transmitting the RS2 Slice1 multicast packet in the spot beam SB. The first terminal HLS multicast receiver 118-1 therefore receives RS2 Slice1 multicast packet. A first terminal resource, such as HLS multicast receiver 118-1, can extract the RS2 Slice 1 packet from the RS2 Slice1 multicast packet, and load the extracted RS2 Slice 1 into the first terminal local slices cache, for example, first terminal local slices cache 120-1.

In response to RS2 Slice1 being loaded, at 307, into the first terminal local slices cache (e.g., the FIG. 1 first terminal slices cache 120-1), the streaming provider first terminal proxy 203 can respond to both the first client HTTP request for RS2 Slice1 (received at 205) and the second client HTTP request for RS2 Slice1 (received at 301). The streaming provider first terminal proxy 203 can, for example, at 309 retrieve RS2 Slice1 from the first terminal local slices cache and, at 310, send RS2 Slice1 to the first client, e.g., the IPTV example of CT1, and to the second client, e.g., the multimedia player example of CT2.

Either during, overlapping with, or after operations 305 through 310, the AGM gateway 102 can receive, at 311, the second client RS2 Slice1 from the multiple resolution live streaming server 122. The second client RS2 Slice1, in this example, is in response to the second client HTTP request for RS2 Slice1 that the AGM gateway 102 sent at 304. Since the RS2 Slice1 multicast packet has already been sent, at 306, toward the first client 201 and second client 202, the AGM gateway 102 at 312 discards the second client RS2 Slice1 and, at 313, sends acknowledgment that the second client RS2 Slice1 was received.

Referring to FIG. 3B, at 314 the first client 201 sends HTTP GET RS2 Slice2 to the streaming provider first terminal proxy 203. The streaming provider first terminal proxy 203 determines, at 315, that RS1 Slice2 is not in the first terminal local slices cache and, at 316, forwards the first client HTTP GET RS2 Slice2 request to the AGW gateway 102. The AGW gateway 102, at 317, records the full path name of the RS2 Slice2, and the client ID of the first client 201 and, 318, forwards the first client HTTP GET RS2 Slice2 request to the multiple resolution live streaming server 122.

At 319, the AGW gateway 102 receives from the multiple resolution live streaming server 122 the "first client" RS2 Slice2, in response to the first client HTTP GET RS2 Slice2 request. The AGW gateway 102, in response, encapsulates the first client RS2 Slice2 into "RS2 Slice2 multicast packet," which it transmits at 320. The transmittal at 320 is for multicast at 322 that can be received by the terminal for the first client 201 and the second client 202. At 323, the AGW gateway 102 sends acknowledgement of successful receipt of the first client RS2 Slice2. Example operations at 320 can include the SGW 128 transmitting the RS2 Slice2 multicast packet in one of the forward feed uplinks 108 to the satellite 106. Operations at 322 can include the satellite 106 transmitting the RS2 Slice2 multicast packet in the spot beam SB, for reception by the first terminal HLS multicast receiver 118-1. Operations at 322 can also include a first terminal resource, for example, the HLS multicast receiver 118-1, extracting the RS2 Slice 2 packet from the RS2 Slice2 multicast packet, and loading the extracted RS1 Slice 2 into the first terminal local slices cache, for example, the first terminal local slices cache 120-1.

At 324, the first terminal streaming provider's proxy 203 can respond to the first client HTTP GET RS2 Slice2 request sent at 314 by retrieving at 324 the RS2 Slice2 from the first terminal local slices cache and, at 325, delivering it to the first client 201. In an example operation, the client 201 can respond, at 326, with an acknowledgment that can be received by the streaming provider first terminal proxy 203. The streaming provider first terminal proxy 203, at 327, can discard the acknowledgment. The discarding at 327 is performed because, at 323, the AGW gateway 102 already acknowledged successful receipt of the RS2 Slice2. In one example, either before or after the operations at 324 and 325, the second client 202 can send, at 328, the second client HTTP GET RS2 Slice2 request. At 329, the streaming provider first terminal proxy 204 finds the RS2 Slice2 in the first terminal local slices buffer and performs two operations in response. One is a sending, at 330, of RS2 Slice2 to the second client 202. The other is forwarding, at 331, of the second client HTTP GET RS2 Slice2 request to the AGW gateway 102 for forwarding, at 332, to the multiple resolution live streaming server 122. The multiple resolution live streaming server 122, at 333, responds to the second client HTTP GET RS2 Slice2 request with the RS2 Slice2. The second client 202, however, does not need RS2 Slice2, as it was already delivered through operations at 324 and 325. The AGW gateway 102 therefore, at 334, discards the RS2 Slice2 received at 333 but sends, at 335, acknowledgement of successful receipt to the multiple resolution live streaming server 122. The multiple resolution live streaming server 122, by receiving the second client HTTP GET RS2 Slice2 request at 332 and the acknowledgement of successful receipt at 335, can keep a streaming connection open or active for the second client 202.

Continuing with description of example operations in process 300, at 336 the second client 202 can send an acknowledgment to the streaming provider first terminal proxy 203, for forwarding to the multiple resolution live streaming server 122, of successful receipt of the RS2 Slice2 sent at 330. The streaming provider second terminal proxy 203, at 337, can discard the acknowledgment. The discarding at 337 is performed because, at 335, the AGW gateway 102 acknowledged successful receipt of the second client RS2 Slice2, sent by the multiple resolution live streaming server 122 in response to second client HTTP GET RS2 Slice2 request.

Figure 4:
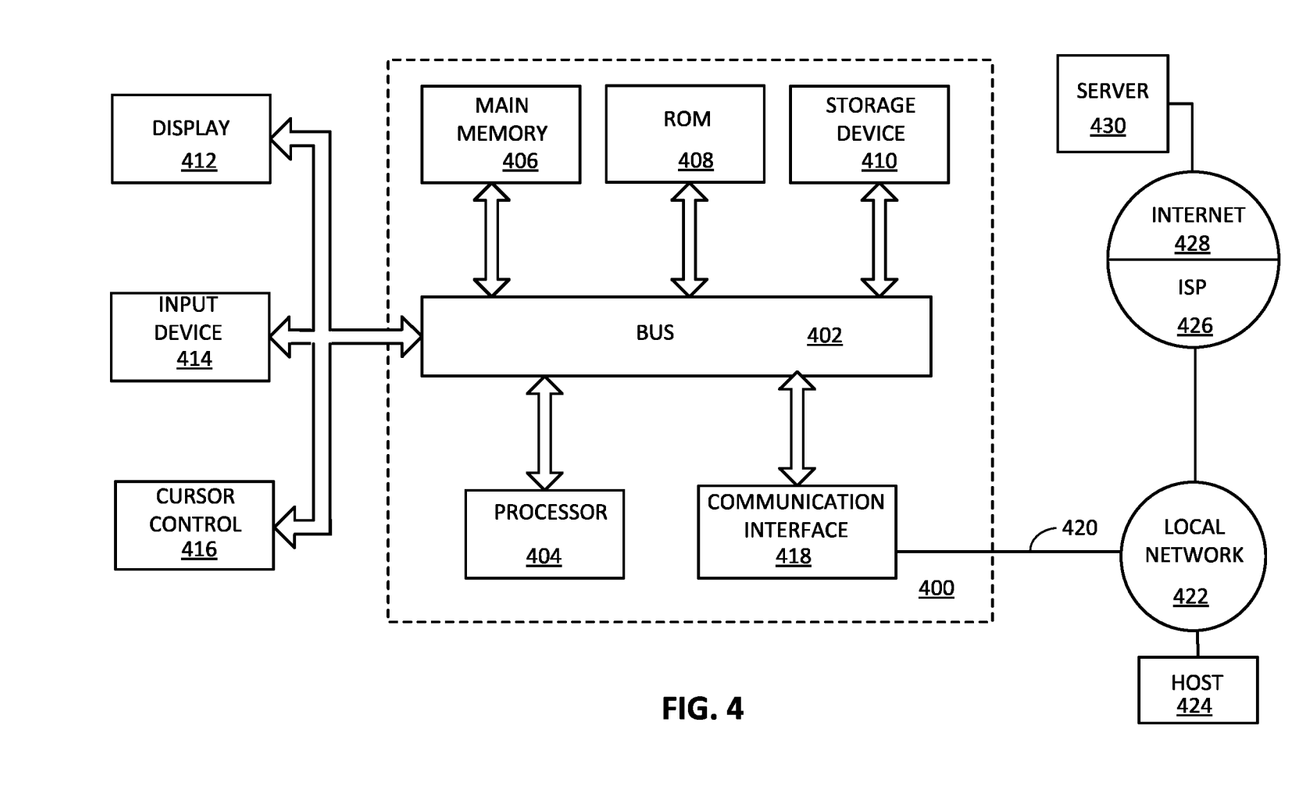
FIG. 4 is a block diagram that illustrates a computer system upon which aspects of this disclosure may be implemented.

FIG. 4 is a block diagram that illustrates a computer system 400 upon which aspects of this disclosure may be implemented, such as, but not limited to, AGW gateway 102, HLS live video aggregator 124, satellite 106, VSAT terminals 104, including the first HLS proxy server 116-1 and second HLS proxy server 116-2, and slices cache 120-1 and 120-2. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT) or liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Another type of user input device is a touchscreen, which generally combines display 412 with hardware that registers touches upon display 412.

This disclosure is related to the use of computer systems such as computer system 400 for implementing the techniques described herein. In some examples, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In some examples, hardwired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over, for example, a telephone line using a modem. A modem local to computer system 400 can receive the data on the telephone line and use, for example, an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter

What is claimed is:

1. A method for multicasting audiovisual streams, comprising:
receiving, at a first terminal, a request from a first terminal client for a slice, the slice being a slice of a live data stream and, in response,
transmitting to a server, via a gateway, the request from the first terminal client for the slice, and
upon reception of the request from the first terminal client for the slice, at the gateway, being a first reception at the gateway of a request for the slice, the gateway determining said request from the first terminal client to be a first request for the slice;

receiving, at a second terminal, a request from a second terminal client for the slice and, in response, transmitting to the server, via the gateway, the request from the second terminal client for the slice;

receiving at the gateway a first instance of the slice from the server, with an indication of being in response to the request from the first terminal client and, in response, upon the gateway having received the request from the second terminal client for the slice in conjunction with the request from the first terminal client for the slice having been determined to be the first request for the slice:

encapsulating the first instance of the slice as a multicast packet, and delivering the multicast packet to the first terminal and the second terminal; and receiving a second instance of the slice from the server, with an indication of being in response to the request from the second terminal client for the slice and, in response, upon the request from the first terminal client for the slice having been determined to be the first request for the slice, dropping the second instance of the slice.

2. The method of claim 1, further comprising:

the first terminal responding to the first terminal client request using the slice in the multicast packet delivered to the first terminal; and the second terminal responding to the second terminal client request using the slice in the multicast packet delivered to the second terminal.

3. The method of claim 2, wherein the first terminal is a first Very Small Aperture Terminal, and the second terminal is a second Very Small Aperture Terminal.

4. The method of claim 3, wherein delivering the multicast packet to the first terminal and the second terminal includes:

transmitting the multicast packet from the gateway to a satellite; and multicasting the multicast packet from the satellite to the first terminal and the second terminal.

5. The method of claim 4, wherein the satellite transmits a spot beam, and wherein the first terminal and the second terminal are in the spot beam, and wherein multicasting the multicast packet from the satellite to the first terminal and the second terminal comprises a one-to-many transmission of the spot beam, concurrent toward the first terminal and the second terminal.

6. The method of claim 1, wherein the first terminal client is a first terminal first client, wherein the method further comprises:

receiving, at the first terminal, a request from a first terminal second client for the slice and, in response, transmitting to the server said request from the first terminal second client for the slice; and the first terminal responding to the request from the first terminal first client for the slice and to the request from the first terminal second client for the slice using the slice in the multicast packet delivered to the first terminal.

7. The method of claim 1, wherein: the live data stream is a first resolution live data stream, wherein the method further comprises:

receiving, at the first terminal, and transmitting from the first terminal to the server, via the gateway, a request from a first terminal second client for a slice of a second resolution live data stream;

upon reception, at the gateway, of the request from the first terminal second client for the slice of the second resolution live data stream being a first reception at the gateway of a request for the slice of the second resolution live data stream, the gateway determining said request from the first terminal second client to be a first request for the slice of the second resolution live data stream;

receiving, at the second terminal, and transmitting from the second terminal to the server, via the gateway, a request from a second terminal second client for the slice of the second resolution live data stream;

receiving, at the gateway, the slice of the second resolution live data stream from the server, with an indication of being in response to the request from the first terminal second client for the slice of the second resolution live data stream and, in response, upon a conjunction of the gateway having received the request from the first terminal second client for the slice of the second resolution live data stream and the request from the first terminal second client for the slice of the second resolution live data stream having been determined to be the first request for the slice of the second resolution live data stream:

encapsulating the slice of the second resolution live data stream as a second resolution multicast packet, and delivering the second resolution multicast packet to the first terminal and the second terminal.

8. The method of claim 7, further comprising:

the first terminal responding to the first terminal second client using the slice in the second resolution multicast packet delivered to the first terminal; and the second terminal responding to the second terminal second client using the slice in the second resolution multicast packet delivered to the second terminal.

9. The method of claim 1, wherein the first instance of the slice, with the indication of being in response to the request from the first terminal client for the slice, is in a first unicast transmission of the slice, and a destination of the first unicast transmission of the slice is the first terminal client, and wherein second instance of the slice, with the indication of being is in response to the request from the second terminal client for the slice, is in a second unicast transmission of the slice, and a destination of the second unicast transmission of the slice is the second client.

10. The method of claim 9, wherein the first unicast transmission of the slice and the second unicast transmission of the slice are at least partially overlapping in time.

11. The method of claim 9, wherein the first unicast transmission of the slice and the second unicast transmission of the slice are non-overlapping in time.

12. The method of claim 1, wherein the first terminal client is a first terminal first client, the method further comprising:

receiving, at the first terminal, a first terminal second client request for the slice, in response, transmitting the first terminal second client request for the slice from the first terminal to the server; and the first terminal responding to the first terminal second client request for the slice using the slice in the multicast packet delivered to the first terminal.

13. A computer readable non-transitory tangible medium on which are stored computer instructions and data that, when executed by a computer, collectively cause the computer to perform the method of claim 1.

14. A method for receiving live streams, comprising
receiving, at a terminal, a request from a terminal first client for a slice, the slice being of a live data stream and, in response, transmitting to a server, via a gateway, the request from the terminal first client for the slice;
upon reception of the request from the terminal first client for the slice, at the gateway, being a first reception at the gateway of a request for the slice, the gateway determining said request from the terminal first client to be a first request for the slice;
receiving, at the terminal, a request from a terminal second client for the slice and, in response, transmitting to the serve, via a gateway, the request from the terminal second client for the slice;
receiving at the gateway a first instance of the slice from the server, with an indication the first instance of the slice is in response to the request from the terminal first client for the slice and, in response,
  upon a conjunction of the gateway having received the request from the terminal second client for the slice and the request from the terminal first client for the slice having been determined to be the first request for the slice, encapsulating the first instance of the slice as a multicast packet, and delivering the multicast packet to the terminal;
the terminal responding to the request from the terminal first client and to the request from the terminal second client using the slice in the multicast packet delivered to the terminal; and
receiving a second instance of the slice from the server, with an indication of being in response to the request from the terminal second client for the slice and in response, upon the request from the terminal first client for the slice having been determined to be the first request for the slice, the gateway dropping the second instance of the slice.

15. The method of claim 14, wherein:
the first instance of the slice is in a first unicast transmission of the slice, and a destination of the first unicast transmission of the slice is the terminal first client, and
the second instance of the slice is in a second unicast transmission of the slice, and a destination of the second unicast transmission of the slice is the terminal second client.

16. The method of claim 14, the method further comprising:
storing at the terminal the request by the terminal first client for the slice and the request by the terminal second client for the slice; and
extracting the slice of the live data stream from the multicast packet and storing the extracted slice in a slices cache, and
wherein the terminal responding to the request from the terminal first client and to the request from the terminal second client includes retrieving the extracted slice from the slices cache and, in response to the request by the terminal first client for the slice, sending the extracted slice to the terminal first client, and in response to the request by the terminal second client for the slice, sending the extracted slice to the terminal second client.

17. A computer readable non-transitory tangible medium on which are stored computer instructions and data that, when executed by a computer, collectively cause the computer to perform the method of claim 14.

* * * * *